July 4, 1939.  P. E. KÖSTER  2,164,412
NAVIGATING APPARATUS FOR INSTRUCTION PURPOSES
Filed July 30, 1937  9 Sheets-Sheet 1
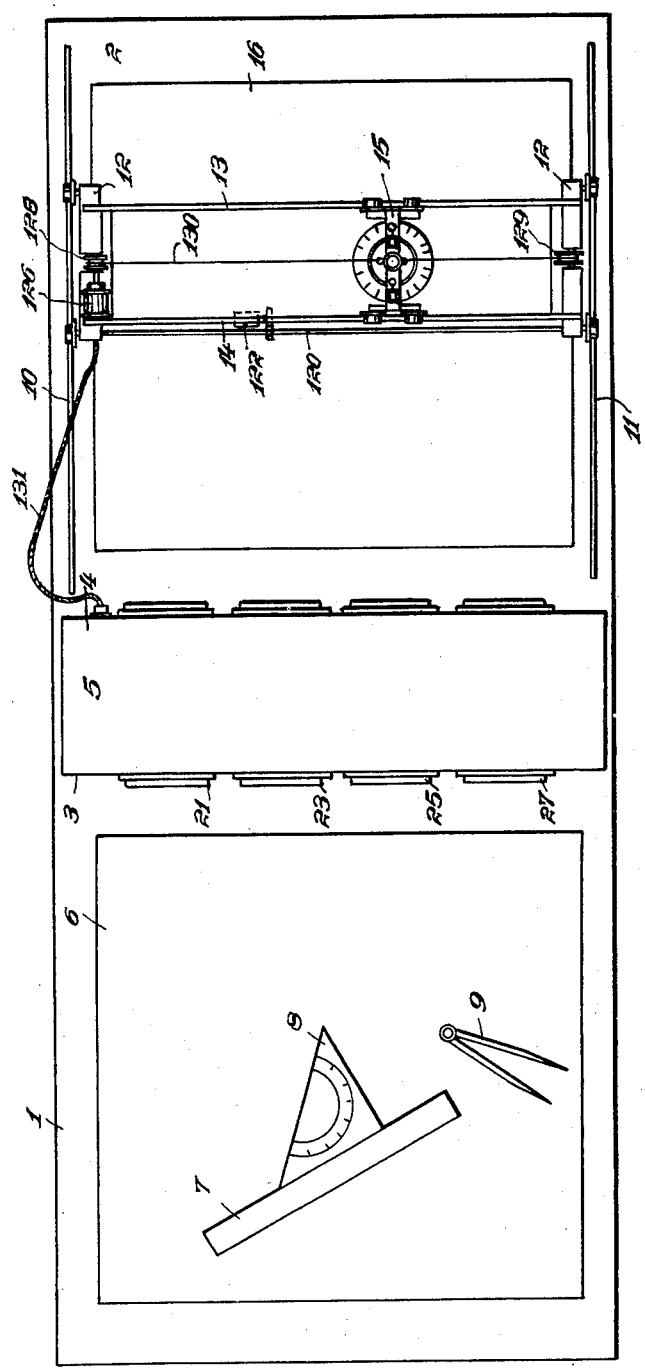

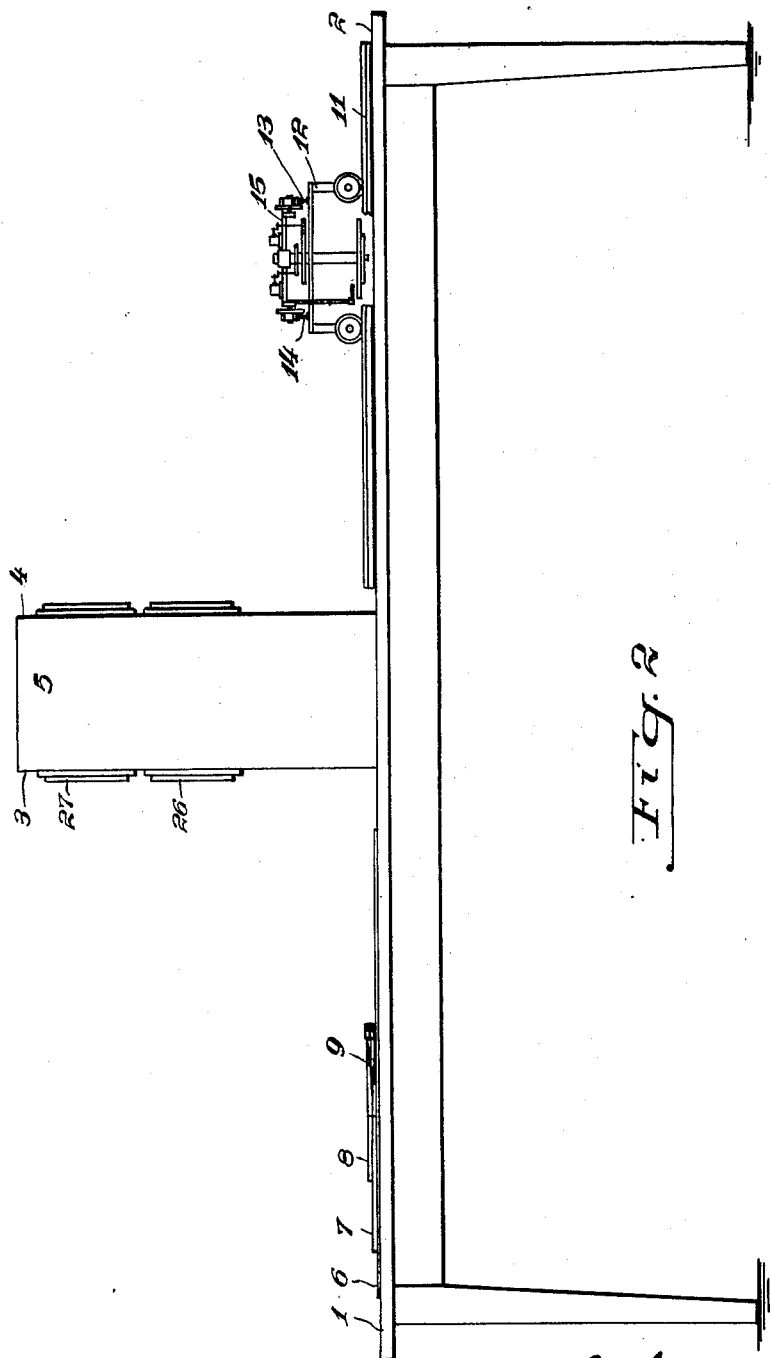

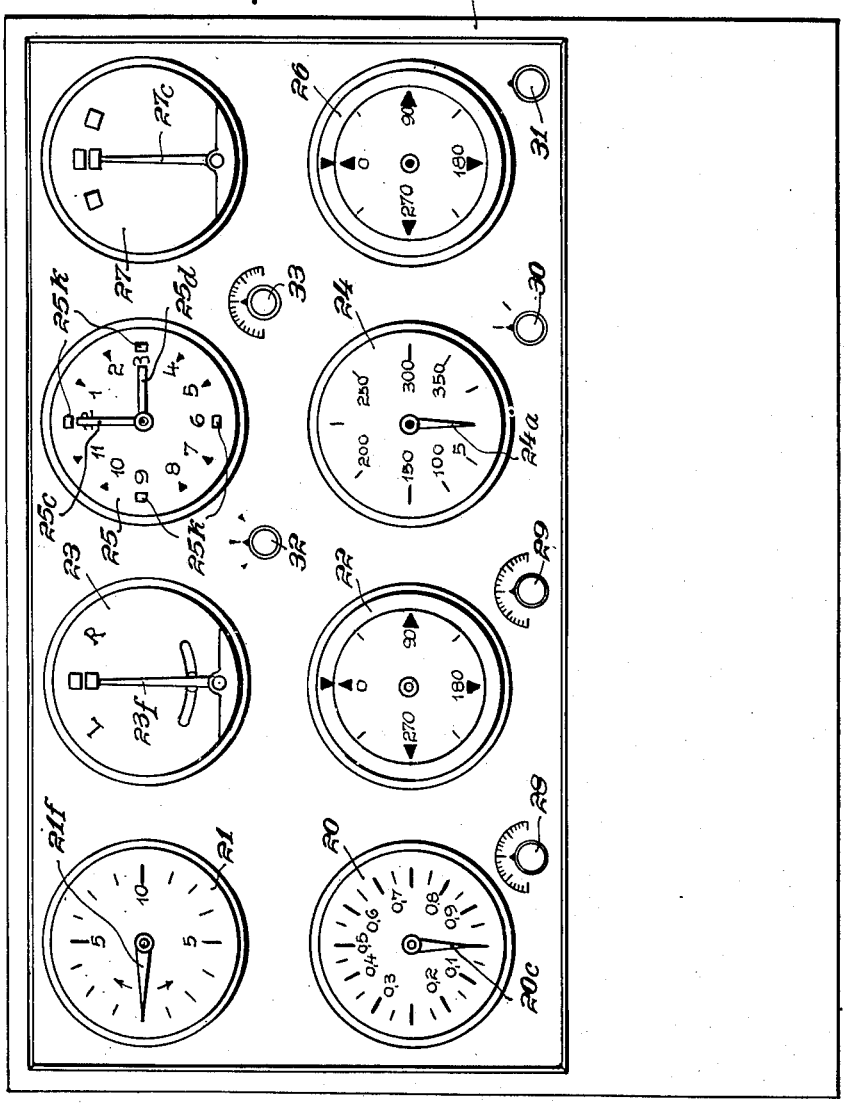

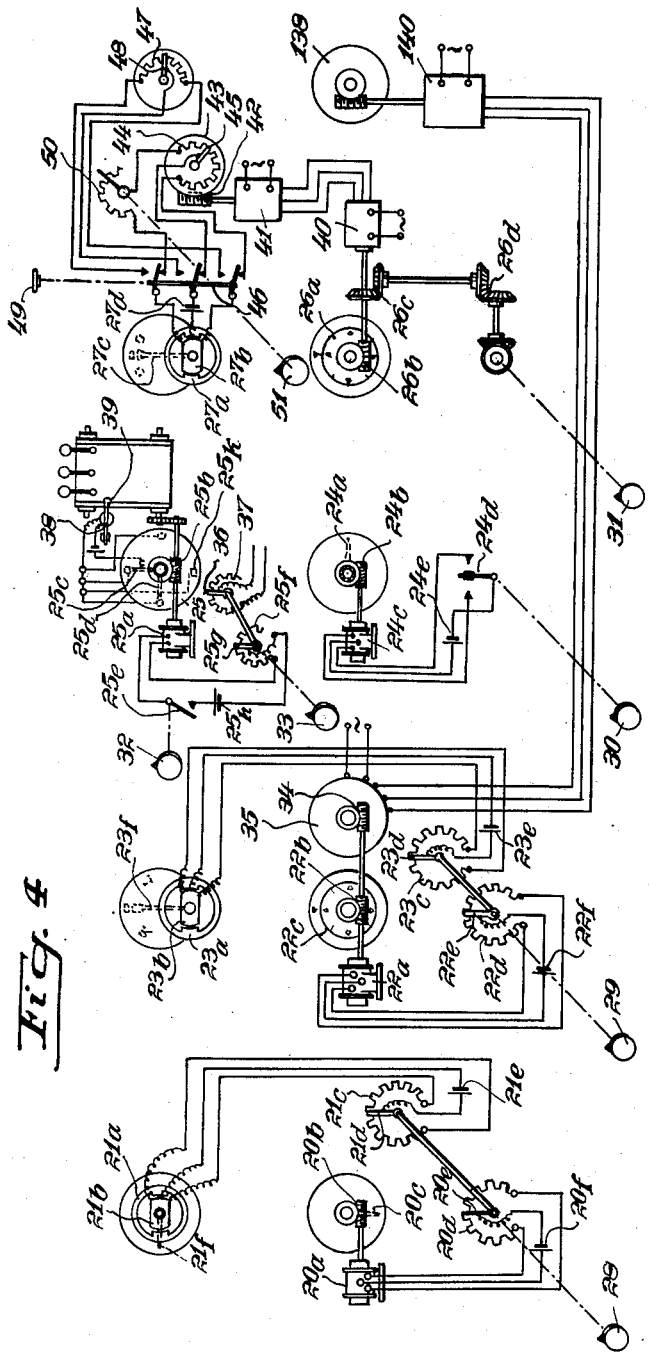

July 4, 1939. P. E. KÖSTER 2,164,412
NAVIGATING APPARATUS FOR INSTRUCTION PURPOSES
Filed July 30, 1937 9 Sheets-Sheet 5
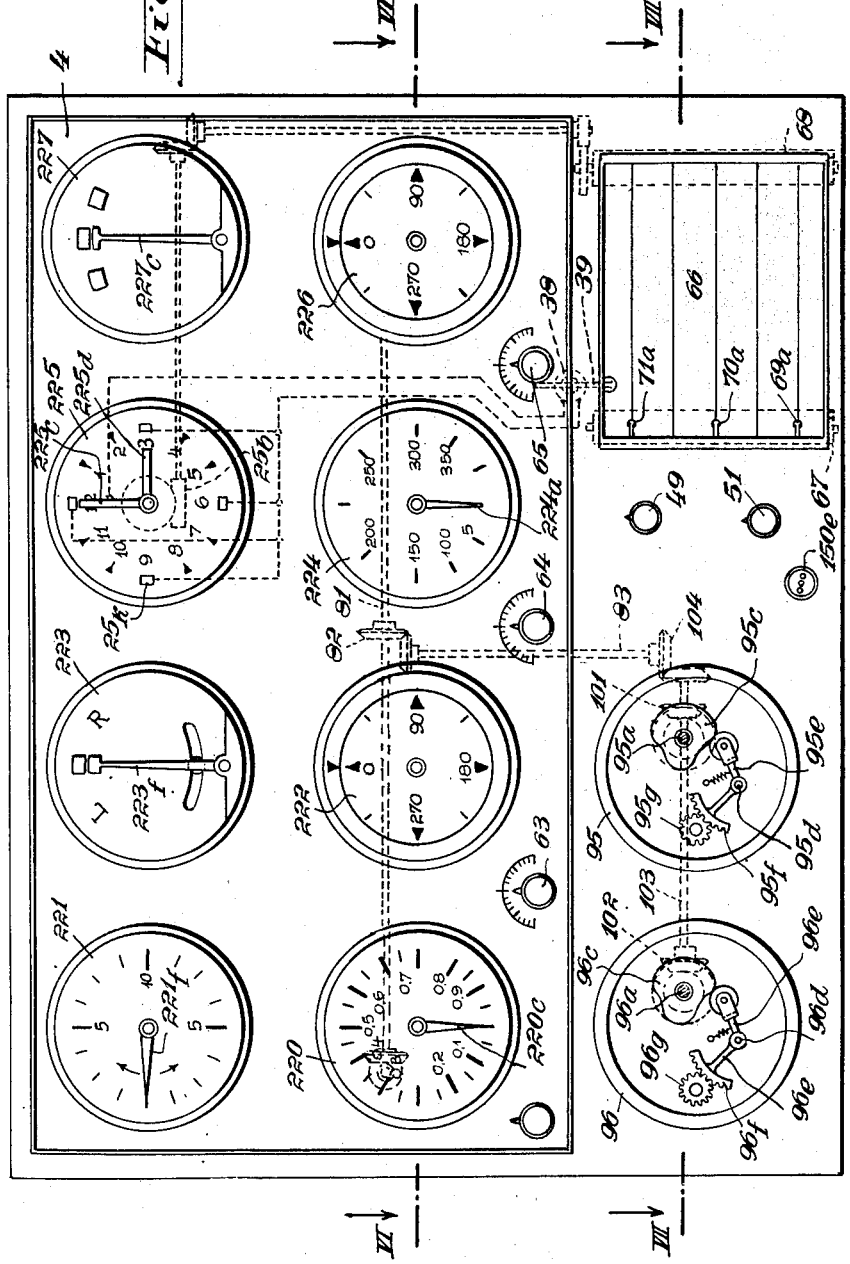

July 4, 1939.  P. E. KÖSTER  2,164,412
NAVIGATING APPARATUS FOR INSTRUCTION PURPOSES
Filed July 30, 1937  9 Sheets-Sheet 6
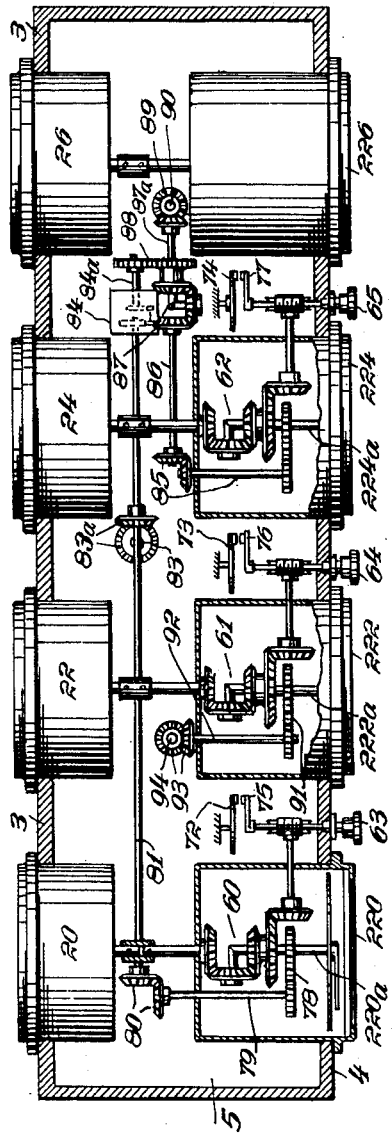
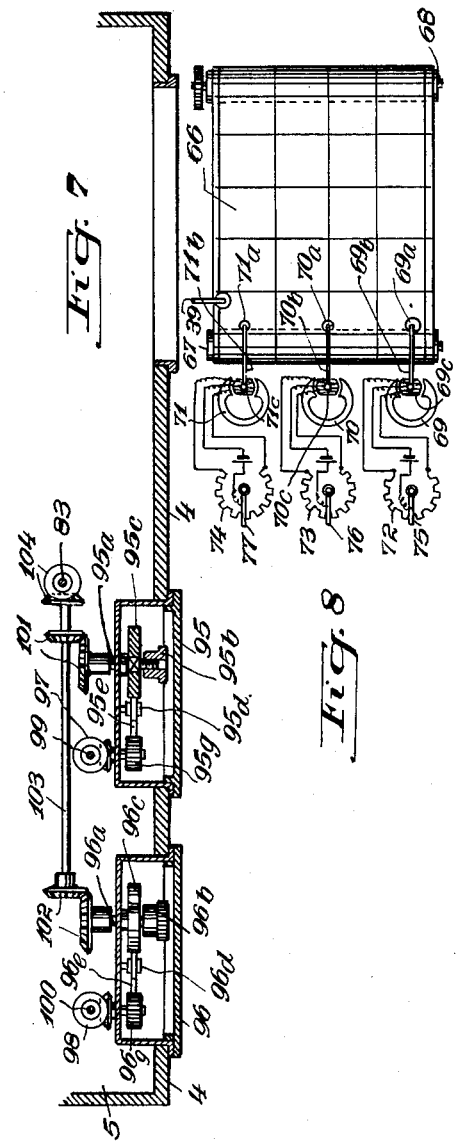
Paul Edward Köster
Inventor
by Knight Atty.

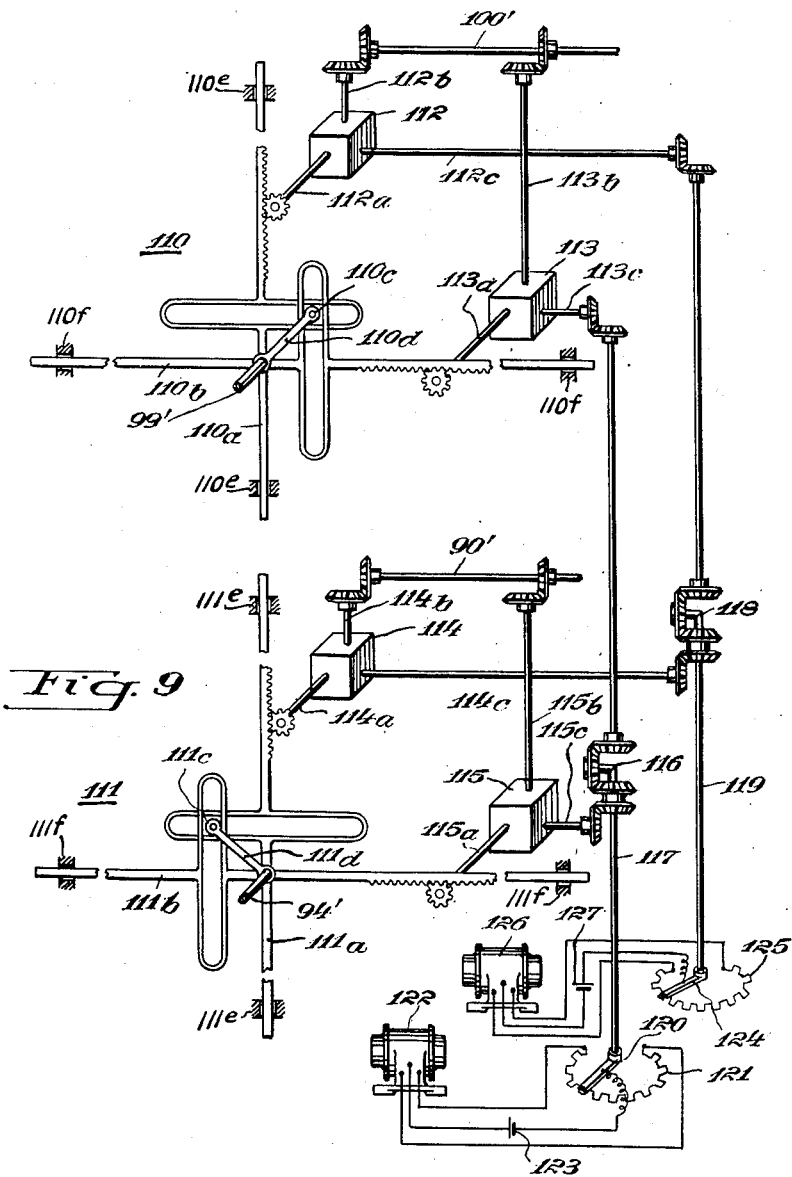

July 4, 1939. P. E. KÖSTER 2,164,412
NAVIGATING APPARATUS FOR INSTRUCTION PURPOSES
Filed July 30, 1937 9 Sheets-Sheet 9

Paul Eduard Köster
Inventor
by Knight Watty

Patented July 4, 1939

2,164,412

UNITED STATES PATENT OFFICE 2,164,412

NAVIGATING APPARATUS FOR INSTRUCTION PURPOSES

Paul Eduard Köster, Berlin-Siemensstadt, Germany, assignor to Siemens Apparate und Maschinen Gesellschaft mit beschränkter Haftung, Berlin, Germany, a corporation of Germany Application July 30, 1937, Serial No. 156,566
In Germany July 30, 1936

22 Claims. (Cl. 35—12)

My invention relates to a navigating apparatus for instruction purposes.

The object of the present invention is to provide a navigating apparatus for instruction purposes which enables the theoretical solution of a navigation problem in a manner as similar as possible to the conditions occurring in practice and, furthermore, permits subsequently checking the solution objectively.

According to the invention, an operating table for the pupil is provided with signal transmitters for adjusting the course and speed, and, preferably, also for adjusting the altitude of an imaginary flight, while a second table for the teacher is provided with a recording device which indicates the course flown in accordance with the signals transmitted by the above-mentioned signal transmitters.

In the accompanying drawings is shown an embodiment of my invention in diagrammatic form.

Fig. 1 is a top view and

Fig. 2 a side view of the apparatus.

Fig. 3 is a front view of the instrument board at the pupil side.

Fig. 4 shows the inner construction and the connection of the instruments at the pupil side.

Fig. 5 is a front view of the instrument board at the teacher side.

Fig. 6 is a section through both instrument boards taken on the line VI—VI of Fig. 5.

Fig. 7 is a section through both instrument boards taken on the line VII—VII of Fig. 5.

Fig. 8 shows a detail of a multiple recording device for the instrument board of the teacher side.

Fig. 9 shows the control device for operating a runway and a carriage for recording the course.

Figures 14, 16:
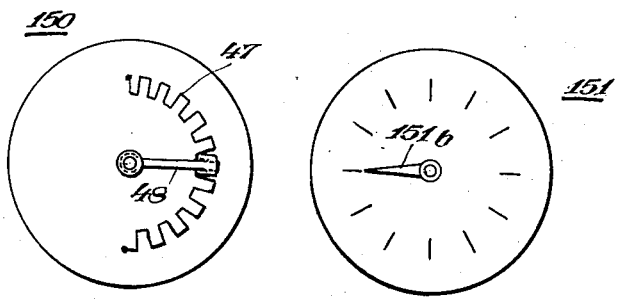

Fig. 16 a top view of a course rose for practicing radio bearings from ground-station.

Figure 17:
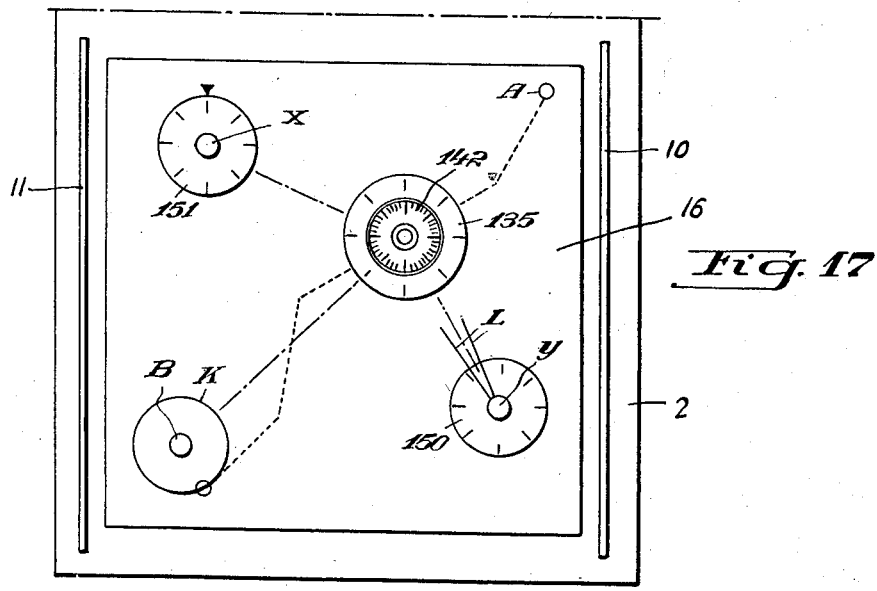

Fig. 17 is a top view of the recording surface of the teacher's table provided with means for explanatory purposes.

As will be seen from Figs. 1 and 2, the novel navigation equipment comprises at least one traverse table 1 intended for the pupil and one traverse table 2 for the teacher. Although it is customary to speak of traverse tables, this does not mean that these two traverse tables 1 and 2, so far as the shape of the table is involved, should not form a single table as is shown in Fig. 2. To each traverse table are allotted instrument boards 3 and 4 respectively, which form the walls of a frame 5. At the traverse table 1, which is covered with a navigation map 6, the pupil works with the aid of a rule 7, a course triangle 8 and dividers 9 on his navigation problem, and gives his signals for carrying out the flight, as to course, speed and height, by operating the signal transmitters provided on the instrument board 3.

In accordance with the signals adjusted by the pupil a recording mechanism is controlled running over the traverse table 2. The recording mechanism comprises rails constituting a runway 12 travelling on rails 10 and 11 of the traverse table 2, and a carriage 15 travelling on rails 13 and 14 of the runway 12. The rails 13 and 14 extend perpendicularly to the rails 10 and 11. Consequently, any air way may be recorded with the aid of a recording pin carried by the carriage 15 by resolving the air way under consideration into two components perpendicular to each other and causing runway 12 and carriage 15 to be driven in accordance with each component. A map 16 which corresponds to the map 6 of the traverse table 1, is preferably employed as recording surface.

Devices are provided which permit any values of wind velocity and wind direction to be adjusted on the signal transmitters located at the teacher side. These values influence the air way recorded by the recording runway in such a manner as is the case when a flight is being actually carried out.

The embodiment comprises other devices to familiarize the pupil with radio bearings from ground station and direction findings, as well as with arrivals at a fixed destination and beacon arrivals, as far as possible as in actual practice.

The recording instruments provided at the pupil side and at the teacher side correspond in appearance to the instruments employed in practice, although the instrument mechanisms in view of the purpose under consideration, have a design differing from the standard instruments.

Fig. 3 shows the front view of the instrument board at the pupil side. The board is provided with an instrument 20 having the appearance of an altimeter, an instrument 21 having the appearance of an ascent and descent indicator (variometer), an instrument 22 having the appearance of an auxiliary compass, an instrument 23 having the appearance of a turn indicator, an instrument 24 having the appearance of a speedometer, an instrument 25 representing a timepiece, an instrument 26 having a course rose for solving problems of direction finding, and an instrument 27 having the appearance of a zero indicator for the apparatus for taking the bearings. 28 to 33 are signal transmitters or control knobs for the individual instruments.

The interior construction of the instruments and their connection are shown in Fig. 4, the various apparatus in Fig. 4 being shown in the same sequence as in Fig. 3.

As will be seen from Fig. 4, the mechanism of the instrument 20 comprises an electric motor 20a which drives the shaft of the pointer 20c through a worm gear 20b. The motor is connected in differential connection to the power source 20f through a resistance 20d and a wiper 20e cooperating with the resistance. The wiper is connected to the shaft of the control knob 28. Depending upon whether the wiper 20e is moved in the one or the other direction from its central position with respect to the resistance 20d, the motor 20a rotates in the one or the other direction. The speed of the motor 20a is dependent upon the magnitude of the deflection of the wiper 20e from the central position.

The mechanism of the instrument 21 is designed in the form of a rotary magnet. It comprises a permanent magnet 21a in whose field a movable coil 21b is rotatably mounted. The rotary coil is tapped in the center and connected in differential connection to the power source 21e through a resistance 21c and a wiper 21d which is also mounted on the shaft of the control knob 28. On the shaft of the movable coil is mounted the pointer 21f. If the wiper 21d is in the central position with respect to the resistance 21c, the movable coil 21b and the pointer 21f associated therewith assume the zero position. Upon the deflection of the wiper 21d in the one or the other direction, the moving coil 21b and the pointer 21f are caused to deflect in a corresponding manner.

By means of the above-described connections, the indications of the instruments 20 and 21 and the control knob 28 accurately imitate the conditions of actual aviation. If the pupil rotates the control knob 28 for the altitude in the one or the other direction, the altimeter 20 varies its adjustment. The greater the deflection of the control knob 28 from the zero position, the quicker this variation is effected. Also the instrument 21 indicates both the speed of the vertical descent and the climbing speed depending upon the deflection of the control knob 28. Consequently, the pupil has much the same impression as if he were flying.

The mechanisms for operating instruments 22 and 23 are designed in the same manner as the mechanisms of the instruments 20 and 21, like parts being denoted by like reference characters as far as the letters are concerned. If the pupil rotates the control knob 29 away from its zero position in the one or the other direction so as to change the course, the course rose coupled to the motor 22a rotates in instrument 22 relatively to the stationary lubber line, the speed of rotation being the greater, the further the control knob 29 is deflected from the zero position. At the same time the instrument 23, having the appearance of a turn indicator, indicates the turning speed of the airplane corresponding to the deflection of the control knob 29.

The motor 22a is operatively connected through the worm gear 34 with a transmitter 35 to be hereinafter described.

The pointer 24a of the instrument 24 is operatively connected through a worm gear 24b to a motor 24c which is connected in differential connection to the power source 24e through a switching device 24d. The wiper of the switching device 24d is coupled to the shaft of the control knob 30. Depending upon the direction of rotation in which knob 30 is rotated, motor 24c runs in clockwise or counter-clockwise direction. If desired, regulating resistances as connected with motors 20a and 22a could also be provided for motor 24c so that the speed of motor 24c depends upon the degree of rotation of control knob 30 from the zero position. If the pupil when solving his navigation problem wishes to adjust the speed of the airplane to a desired value he displaces the control knob 30 in the one or the other direction until the pointer 24a indicates the desired speed of flight.

The speed of the instrument 25 representing the timepiece should be regulable over a considerable range of about 1:10 or 1:20. To this end, a motor 25a is provided which is coupled with the minute hand 25c and the hour hand 25d through a worm gear 25b. The motor 25a is connected to the power source 25h through a switch actuated by the control knob 32 and through a resistance 25f and a wiper 25g. The wiper 25g is mounted on the shaft of the control knob 33. The speed of the instrument 25 representing the clock depends, consequently, upon the adjustment of this knob 33.

To the shaft of the control knob 33 is further secured a wiper 36 which moves over a resistance 37. The purpose of this rheostat will be hereinafter described.

The scale of timepiece 25 is provided with four contacts 25k which cooperate with hand 25c and are displaced 90° from one another. This contact arrangement is connected in the energizing circuit of an electromagnet 38, with the aid of which after every quarter of an hour, referred to the instrument 25, the tape of a multi-recorder 39, to be hereinafter described, is provided with a time mark.

The course rose 26a of the instrument 26, rotatable relatively to the fixed lubber line, is mechanically coupled with the control knob 31 through a worm gear 26b and bevel gears 26c, 26d and 26e. Besides the course rose 26a, a transmitter 40 is connected to the control knob 31 through said gears so as to be adjusted together with course rose 26a. This transmitter is connected to a receiver 41 which in turn adjusts a disk 43 through a worm gear 42. To the disc 43 is secured a resistance 44 over which slides a wiper 45. The purpose of these elements will be hereinafter described.

The mechanism of the zero indicator 27 comprises a permanent magnet 27a and a coil 27b rotatably mounted within the field of this permanent magnet, the shaft of said coil 27b being connected with the pointer 27c of the zero indicator. The moving coil 27b is tapped at its midpoint and connected in differential connection to the power source 27d through the above-mentioned resistance 44 and the wiper 45, or through a resistance 47 and a wiper 48, depending upon the position of the three-pole switch 46. If the wiper 45 or 48 is in the central position with respect to the corresponding resistance, the pointer 27c is in the zero position, whereas, if the wiper 45 or 48 is deflected in the one or the other direction from the central position, the pointer 27c is also deflected in either direction by a corresponding angle from the zero position.

The three-pole switch 46 may be adjusted through the control knob 49. The resistance 44 cooperates further with a rheostat 50 which may be adjusted through the knob 51. The purpose of these elements will be hereinafter described.

As will be seen from Fig. 5, the instrument board 4 at the teacher side comprises instruments 220 to 227 which, as to appearance, correspond to the instruments 20 to 27 of board 3. The indicating members of the instruments 221, 223 and 225, 227 and 226 are mechanically coupled with the indicating members of the corresponding instruments arranged at the pupil side, for instance, in such a manner that the shafts of the rotatable indicating members of oppositely arranged instruments are connected with each other, as shown in Fig. 6 with respect to the instruments 26 and 226. In the case of instruments 25 and 225 it is sufficient if only hand 225c is connected with hand 25c in the above-described manner, while hand 225d is driven by hand 225c through a transmission gear.

Since the instruments of the instrument board 3 are displaced 180° with respect to the instruments at the teacher side, the shafts of the indicating members of the instruments at the teacher side must be rotated in a direction which is opposite to the direction of rotation of the corresponding instruments at the pupil side. This may, for instance, be accomplished in a simple manner by inserting in the connection between two coupled instruments a reversing gear. This gear, by selecting its ratio of transmission greater than 1:1, may also serve to eliminate the reduction which, with respect to instruments 220, 222 and 224, is caused by the differential gears to be described hereinafter.

The indication of instruments 220 to 222 and 224 may be varied by the teacher without these variations being indicated on the corresponding instruments 20, 22 and 24 arranged at the pupil side. In this manner, human calculation errors or technical control or indication errors may be imitated. To this end, the shafts 220a, 222a and 224a of the indicating members of the instruments 220, 222 and 224 are not directly connected to the shaft of the corresponding instruments 20, 22 and 24, but through a differential gear 60, 61 and 62 respectively. A bevel gear of said differential gears is coupled with each control knob 63, 64 and 65 respectively, as will be seen from Fig. 6.

If the control knobs 63 to 65 are in the zero position, the value adjusted on the instruments 20, 22 and 24 will be transmitted unvaried to the instruments 220, 222 and 224. If one of the control knobs 63 to 65 is moved from the zero position in either direction, the corresponding instrument at the teacher side will indicate a value which differs from the value indicated by the corresponding instrument at the pupil side by an amount corresponding to the displacement of the control knob in question.

In order to objectively check the solution of the problem, it is advisable to register the changes of the values of the height, course and speed effected with the aid of the control knobs 63 to 65. To this end, a multiple recorder is provided as shown in detail in Fig. 8. 66 denotes a recording tape which runs off at a constant speed from the roller 67 when the instrument is in operation and is taken up by the roller 68. Each recording mechanism comprises a moving coil measuring mechanism 69, 70 and 71, as well as a recording pen 69a, 70a and 71a respectively, which pen is carried by a lever 69b, 70b and 71b respectively, secured to the shaft of the moving coil of the corresponding measuring mechanism. Each of said moving coils 69c, 70c and 71c is tapped off from the center and connected in differential connection to a power source through a resistance 72, 73 and 74 and a wiper 75, 76 and 77 respectively. In the central position of said wipers 75 to 77 with respect to the corresponding resistances 72 to 74, the recording pens 69a to 71a are in the zero position. If one of the wipers 75 to 77 is deflected in either direction, the corresponding recording pen is correspondingly deflected.

The said wipers 75 to 77 are arranged on the shafts of the control knobs 63 to 65 as shown in Fig. 6, whereas the corresponding resistances 72 to 74 are fixed relatively to the instrument.

It will be apparent that the magnitude and the direction of a deflection of the control knobs 63 to 65 from the zero position is recorded with the aid of the multiple recorder shown in Fig. 8. The recording tape 66 is provided with time marks, in accordance with the indications of the timepiece 25, which are produced with the aid of the above-mentioned magnet 38 (Fig. 4) and of the lever 39 (Figs. 4, 5 and 8) connected with the armature of the magnet. Therefore, the moments of time at which the teacher changes the values of the height, course or the speed adjusted by the pupil, may also be read off from the recording tape 66.

The multiple recorder shown in detail in Fig. 8 is preferably arranged on the instrument board 4 as shown in Fig. 5.

The energy serving to operate the recording device and the other gears are controlled in accordance with the adjustment or movement of the shafts 220a, 222a and 224a (Fig. 6) as is explained in the following. The altitude value, indicated by the instrument 220 through the gear 78, the shaft 79, the bevel gear 80 and the shaft 81, is transmitted on the one hand to a cam gear mechanism connected with shaft 81, and on the other hand through the bevel gear 82 and a shaft 83 (cf. Figs. 6 and 7) to two gears, shown in Fig. 7, which serve to produce an indication of an imaginary wind direction and a wind velocity in dependence upon the height. By means of the cam gear 84 the value of the speed of flight derived from the instrument 224 through the gears 85 and the shaft 86, is automatically corrected in the differential gear 87 in accordance with the altitude being flown at. To this end, as shown in Fig. 6, the shaft 86 cooperates with a bevel gear of a differential gear 87, while the driven shaft 84a, coming out of the cam gear mechanism 84, is coupled through a gear 88 with the other bevel gear of the differential gear 87. As a result, shaft 87a of differential gear 87 rotates at a speed which represents the imaginary air speed of the airplane corrected in dependence upon the altitude. Through the shaft 87a, the bevel gear 89 and the shaft 90, this corrected speed value is supplied to the calculating device shown in Fig. 9 to which also the control course is supplied which is derived from instrument 222 by the gear 91, the shaft 92, the bevel gear 93 and the shaft 94 (Fig. 6).

The above-mentioned cam gear 84 may be designed in the same manner as the cam gears 95 and 96, described in the following paragraph, for supplying the direction of wind and the wind velocity.

The two gears shown in Figs. 6 and 7 comprise each a rotatably mounted shaft 95a and 96a on which a cam disk 95c and 96c is detachably secured with the aid of a nut 95b and 96b respectively. The cam shafts 95c and 96c are scanned with the aid of double armed contact levers 95e and 96e respectively, which are rotatably mounted as indicated at 95d and 96d.

The adjustments of the contact lever are supplied to the calculating device shown in Fig. 9 through an arcuate gear 95f and 96f (Fig. 5) connected with the corresponding contact levers 95e and 96e respectively, through a pinion 95g and 96g, a bevel gear 97 and 98 (Fig. 7) and a shaft 99 and 100 respectively. The shafts 95a and 96a are coupled through bevel gears 101 and 102, a shaft 103 and another bevel gear 104 with the above-mentioned shaft 83 which supplies the altitude value taken from the instrument 220. The cam disks 95c and 96c (Figs. 5 and 7), therefore, are adjusted continuously in accordance with the height of flight. They are so shaped (Fig. 5) that shaft 99 is adjusted according to the current value of the wind direction and thus supplies this value to the calculation device shown in Fig. 9, and that shaft 100, accordingly, is operated in accordance with the value of the wind velocity and supplies this second value also to the calculation device. The conditions according to which the wind velocity and the direction of wind vary in accordance with the height may, of course, be chosen at will. Accordingly, a number of different cam disks may be kept available, any one of which when solving a problem may be inserted into instrument 95 and instrument 96. The teacher may also exchange the cam disks while a problem is being worked out. One may also proceed in such a manner that before a flight is to be performed, for instance from a given geographical point A to a geographical point B, the cam disks to be inserted in instruments 95 and 96 are cut from cardboard, Celluloid or the like on the basis of the weather charts.

The calculating device according to Fig. 9 will now be described. It comprises two sine-cosine gears 110 and 111, one of which is employed to resolve the unit vector of the wind direction into two components perpendicular to each other, while the other gear in the same manner resolves the unit vector of the control course. Each sine-cosine gear comprises two slides 110a and 110b, 111a and 111b, which are guided in stationary bearings 110e, 110f and 111e, 111f respectively, and whose directions of displacement enclose an angle of 90°. Each slide is provided with a cross yoke, and a slide block 110c and 111c respectively of each gear simultaneously engages the two yokes belonging to that gear. Each slide block is pivoted on the crank pin of a crank arm 110d and 111d respectively, which is mounted to a crank shaft 99' and 94' respectively. The geometrical axis of rotation of the cranks passes through the point of intersection of the two corresponding slides 110a, 110b, 111a, and 111b.

The components of the unit vector of the wind direction and those of the unit vector of the compass course will be hereinafter designated as NS-components and EW-components, on the supposition that, with reference to Fig. 1, the map 16 is so placed on the traverse table that the NS-direction runs in parallel relation to the rails 10 and 11 and the EW-direction in parallel relation to the rails 13 and 14. The shaft 99' (cf. Fig. 9) is coupled with the shaft 99 (cf. Fig. 7) or forms an extension of this shaft. The shaft 94' (cf. Fig. 9) is also coupled with the shaft 94 (cf. Fig. 6) or a part of this shaft.

Consequently, the unit vectors of the wind direction and of the compass course supplied by the instruments 95 and 222 are resolved into the NS- and EW-components with the aid of the sine-cosine gears 110 and 111. These components are to be multiplied by the absolute value of the wind velocity and of the relative speed of the airplane, in order to obtain the components of the wind velocity and of the relative speed of the airplane in the NS-direction and EW-direction. The NS-component of the wind velocity is determined with the aid of the multiplication gear 112 (Fig. 9) which on the one hand is coupled at the inlet side through the shaft 112a with the NS-slide of the sine-cosine gear 110, and on the other hand through the shaft 112b with the shaft 100'. Shaft 100' is in turn coupled with the shaft 100 (Fig. 7) or forms an extension of this shaft and thus supplies the calculating device with the current value of the absolute wind velocity. Accordingly, the multiplication gear 112 supplies by its outlet shaft 112c the NS-component of the wind velocity. In a corresponding manner, a multiplication gear 113 is coupled at its inlet side with the EW-slide 110b through a shaft 113a, and with the above-mentioned shaft 100' through a shaft 113b. The outlet shaft 113c of gear 113 therefore supplies the EW-component of the wind velocity.

The NS-component of the relative speed of the airplane is determined with the aid of a multiplication gear 114. The latter is coupled at its inlet side with the NS-slide 111b of the gear 111 through a shaft 114a, and with the shaft 90' through a shaft 114b. The shaft 90' is coupled with the shaft 90 (Fig. 6) or forms an extension of this shaft and thus supplies the calculating device with the absolute value of the relative speed of the airplane corrected in accordance with the height. Consequently, the multiplication gear 114 through its outlet shaft 114c furnishes the NS-component of the relative speed of the airplane. Finally, a multiplication gear 115 which is coupled with the EW-slide of the gear 111 through a shaft 115a, and with the above-mentioned shaft 90' through a shaft 115b, supplies through its outlet member 115c the EW-component of the relative speed of the airplane.

The NS-component of the wind velocity and the NS-component of the relative speed of the airplane are added by means of a differential gear 116 so that the adjustment of the result member 117 of the differential gear 116 is a measure for the speed of the airplane over ground in the NS-direction. The EW-component of the wind velocity and the EW-component of the relative speed of the airplane are correspondingly added in a differential gear 118. Consequently, the adjustment of the result member 119 of the differential gear 118 is a measure for the speed of the airplane over ground in the EW-direction.

The multiplication gears 112 to 115 may consist of calculating gears of known types, such for instance disclosed in the German Patent 519,924.

The control for the NS-runway 12 (Figs. 1 and 2) is derived from the adjustment of the result member 117 (Fig. 9), and the control of the EW-runway, i. e. of the movement of carriage 15 on rails 13 and 14 is derived from the adjustment of the result member 119 in such a manner that the speed of runway 12 in the direction of rails 10, 11, and the speed of carriage 15 on the rails 13 and 14 is proportional to the adjustment of the corresponding result member 117 and 119 respectively. The speed values in question may, of course, be positive or negative. For the above purposes, known controls may be employed. In the embodiment shown (Fig. 9), the result member 117 adjusts the wiper 120 of a rheostat 121. The motor 122 for operating the NS-runway 12 is connected to a power source 123 in differential connection through this wiper and rheostat arrangement. In a corresponding manner the result member 119 adjusts the wiper 124 of a rheostat 125 controlling the circuit of a power source 127 and a driving motor 126 for operating the EW-runway 15.

In the central position of the wipers 120 and 124 with respect to the corresponding resistances 121 and 125, the motors 122 and 126 are at rest. If the wipers 120 and 124 are deflected in the one or the other direction, the motors run at a speed whose magnitude and direction depend upon the deflection of the wipers.

Further details of the above-said speed control need not be described, since such controls are well-known in the art. However, it might be pointed out that in the network as shown in Fig. 9, the elements 120, 121, 124 and 125 may be used for controlling the field circuits of small generators, which feed the motors for driving the NS-runway 12 and the EW-carriage 15. For the sake of simplicity, however, it is hereinafter assumed that the parts 122 and 126 denote the motors for both runways.

As may be seen from Fig. 1, the motor 122 secured to the frame and the rails 14 of the runway 12 cooperates through a transmission gear with the shaft 120 of one pair of wheels of the runway 12. The motor 126 for the EW-runway is secured to one side of the runway 12 as also shown in Fig. 1. The motor 126 drives, preferably also through a transmission gear, a rope pulley 128. An endless rope 130 secured to the carriage 15 passes over pulley 128 and a second pulley 129 mounted on the other side of the runway 12. Instead, the motor 122 may be mounted on the carriage 15. However, the arrangement shown in Fig. 1 facilitates the supply of current. The current is preferably supplied with the aid of a flexible cable 131 which is connected to the instrument board 4 preferably through a socket.

The illustration of Fig. 1 has not the purpose of showing the construction of the apparatus in all its details, but is only intended to show one of the possible solutions. In practice, for instance, the rails 10 and 11 are preferably designed as cogged rails, and the running wheels of the runway 12 as spur gears. It is, of course, also possible to arrange a rack alongside the rails 10 and 11 and to cause the movement of the runway 12 by means of a pinion meshing with the rack and coupled with the motor 122. Similarly, by the provision of suitable known means, slipping may be prevented between the motor 126 and the rope 130.

Figure 10:
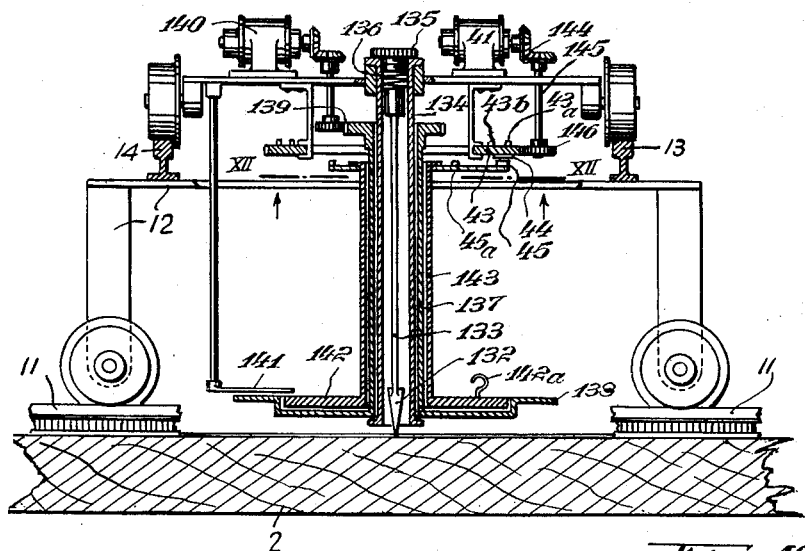
Fig. 10 shows a section through the recording carriage.

As is apparent from Fig. 10, the carriage 15 carries a pen 132 serving to record the distance traversed. The pen is secured to a rod 133 whose piston-shaped end is guided in a hollow shaft 134 firmly secured to the runway 15. To attain a uniform pressure of the pen 132 a compression spring 136 is arranged between the rod 133 and a screw 135 forming a stop.

On the hollow shaft 134 secured to the frame of carriage 15 is mounted a sleeve 137 which carries at its lower end a course rose 138. The sleeve 137 is operatively connected to a receiver 140 through a gear 139. The elements 140 and 138 are also shown schematically in the wiring diagram of Fig. 4. As will be seen from Fig. 4, the receiver 140 is connected to the transmitter 35 which in turn is adjusted in accordance with the control course. Consequently, the course rose 138 indicates the corresponding compass course with respect to the lubber line 141. Accordingly, the angle of drift may be read off from the preferably transparent course rose 138 with respect to the path over ground recorded by the recording pen 132.

For carrying out direction findings aboard the aircraft, a second course rose 142 is provided which is carried by a sleeve 143 rotatably mounted on the sleeve 137. By means of a hook 142a secured to the course rose 142, the latter is connected by a rubber band with the location of the imaginary transmitter of which a bearing is to be taken, i. e. the rubber band is attached to the point of the map 16 shown in Fig. 1, which indicates the transmitter, so that the hook 142a of course rose 142 is drawn into the direction of the transmitter independent of movements of carriage 15. The adjustment of the course rose 142 caused by the rubber band is transmitted to the pupil side by the system shown in the wiring diagram of Fig. 4.

Figure 11:
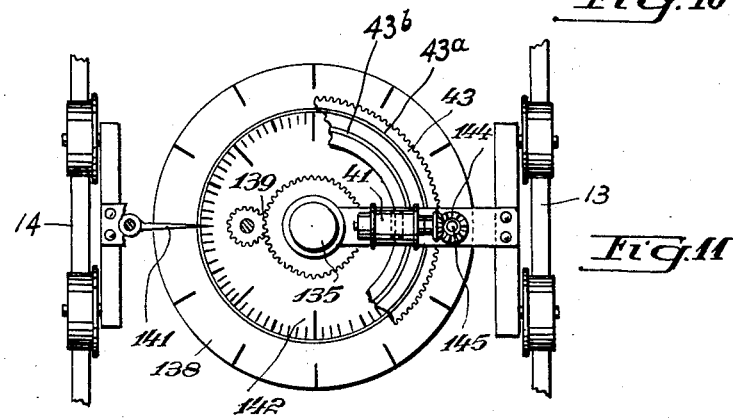
Fig. 11 shows a part top view of the carriage with parts broken away.
Figure 12:
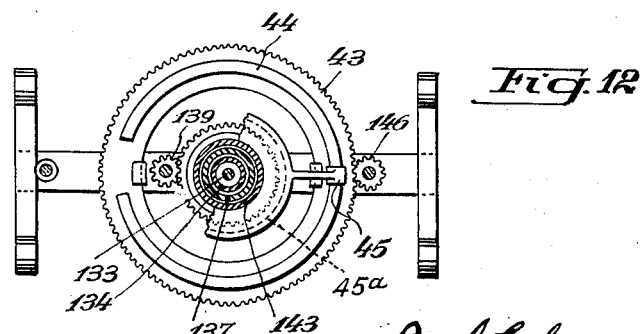
Fig. 12 shows a section through the carriage taken on the line XII—XII of Fig. 10.

This system will now be described in detail by referring to the Figs. 4 and 10 to 12. The wiper 45 shown in Fig. 4 is, as will be seen from Fig. 10, connected with the sleeve 143 and, therefore, with the course rose 142. The disk 43 carrying the resistance 44 is rotatably mounted on the frame of the carriage 15 and is operatively connected to the receiver 41. The coupling between the disk 43 and the receiver 41 is, in Fig. 4, for the sake of simplicity, represented by a worm gear. In the construction shown in Fig. 10, this coupling between transmitter 41 and disk 43 comprises a bevel gear 144, a shaft 145 and a pinion 146 meshing with the toothed periphery of the disk 43. 45a, 43a and 43b are slip rings through which the current is supplied to the rotatable parts 45 and 43 (Figs. 10, 11 and 12).

The direction finding aboard the aircraft is effected in the following manner. The pupil communicates to the teacher the position of the transmitter, the bearing of which is to be taken, whereupon the teacher connects course rose 142 with the location of the transmitter by means of a rubber band. In this manner, the wiper 45 connected with the rose 142 will, as a rule, be deflected from the central position with respect to the resistance 44. This results in a deflection of the zero indicator 27 which, in the position of switch 46 shown in Fig. 4, now is energized through wiper 45 and resistance 44. Then the pupil actuates the rotary knob 31 in the one or the other direction depending upon the deflection of the zero indicator 27. In this manner, the transmitter 40 and the course rose 26 are simultaneously displaced. The receiver 41 follows the transmitter 40 and thereby displaces the disk 43 carrying the resistance 44. The pupil turns the knob 41 until the zero indicator 27 returns to the zero value. The instrument 26 then indicates the adjustment of the course rose 142 and, therefore, the bearing to be taken. Also in this case the teacher has the possibility of adjusting the rheostat 50 through the control knob 51 and to thereby falsify the indication of the bearing at the pupil side for imitating human and technical errors.

If desired, the adjustment of the control knob 51 may be recorded with the aid of the multiple recorder. To this end, only one other rheostat, for instance such as rheostat 72 or rheostat 75, and a corresponding recording system of the multiple recorder need be allotted to the control knob 51.

In the construction shown in Figs. 4, and 10 to 12, only the adjustment of the course rose 142, i. e. the true bearing, is transmitted to the instrument 26. In order to determine thereby the lateral bearing, the pupil must compare the adjustment of the instrument 26 with that of the instrument 22 which indicates the true path. Instead the lubber line of the instrument 26 could be arranged on a rotatable ring which is coupled with the instrument 22 and the motor 22a. In this case the lubber line would directly indicate on the course rose 26a of the instrument 26 the lateral bearing.

Figures 13, 15:
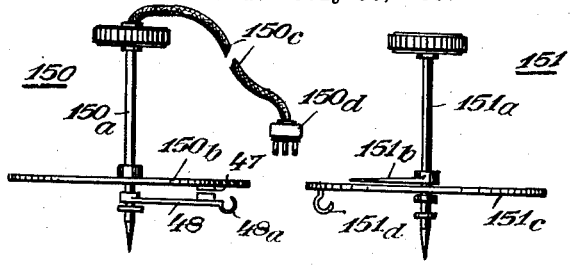
Fig. 13 is a side view of a course rose for practicing approaches to beacons and Fig. 14 shows the course rose viewed from below.
Fig. 15 shows a side view.

The course rose 150 shown in Figs. 13 and 14 is employed for approaching beacons. The rose comprises a hollow shaft 150a on which is secured a disk with rose division 150b. A wiper 48 also shown in Fig. 4 is mounted on the hollow shaft 150a and cooperates with a resistance 47 arranged on the disk 150b. The wiper 48 is provided with a hook 48a. The ends of the resistance 47 and the wiper 48 are connected to one end of a three-conductor cable 150c extending through the hollow shaft 150a. The cable is provided with a three-pin plug 150d by means of which it may be connected to the instrument board arranged at the teacher side. After the insertion of the plug 150d the circuit as shown in Fig. 4 is formed. If a beacon is to be approached, the instrument 140 is pressed into the traverse table 2 at the place of the beacon as indicated on map 16 (Fig. 1). The plug 150d is to be inserted in the socket 150e provided on the instrument board 4. The switch 49 shown in Figs. 4 and 5 is switched over to the position for approaches to beacons, in which position the elements 47 and 48 are connected to the zero indicator 27 of the bearing device (see Fig. 4). Finally the wiper 48 is connected with the place of the recording pen 142 with the aid of a rubber band attached to the hook 48a of the wiper. To this end, one end of the rubber band may be designed in the form of an eye and placed over the lower end of the hollow shaft 143 (Fig. 10).

The disk 150b of the instrument 150 need not necessarily be provided with a rose division. It would suffice if it were provided only with a mark corresponding to the position of the resistance 47, according to which mark the teacher orientates the disk 150b according to the NS-direction of the map 16 placed on the traverse table 2.

Radio bearings from ground stations may be effected by the use of the course rose 151 shown in Figs. 15 and 16. It consists of a shaft 151a with a pointer 151b secured thereto, and of a disk 151c provided with the rose division and rotatably mounted on the shaft. At the periphery of the disk 151c is provided a hook 151d, the location of which coincides with the zero radius of the course rose 151.

If the pupil while navigating intends to take a radio bearing from ground station, he communicates with the teacher. The teacher attaches the course rose 151 to the place of the ground station by pressing the point of shaft 151a into the traverse table 2 (cf. Fig. 17). The pointer 151b is adjusted by the rotation of the shaft 151a to the NS-direction of the map 16 lying on the traverse table 2. Then the teacher connects hook 151d of disk 151c by means of a rubber band with the place of the recording pen 132, i. e. with shaft 134, whereupon the teacher reads off the bearing from the instrument 151 and communicates the value determined to the pupil.

The maps employed in connection with the navigation instrument may be of any scale. Particularly maps of a scale of 1:100,000 to 1:5,000,000 may be taken into consideration. As to the kind of map projection, Mercator maps are particularly suitable; however, the novel apparatus is not limited to the use of such maps.

As to the instrument 25 representing the timepiece, the above described mechanism, allowing a variation of its running speed, presents the advantage that when solving navigation problems the time necessary therefor may be adapted to the corresponding problem; especially, there is the possibility of performing a long distance flight within a considerably shorter time than in actual practice. In accordance with the running speed of the instrument 25 the speed of the motors 122 and 126 for the NS-runway and the EW-runway is to be adjusted. One possibility of such an adjustment is indicated in the wiring diagram of Fig. 4 in which the control member 36 of a rheostat 37 is coupled with the control knob 33 through which the running speed of the instrument 25 is adjusted. Through this rheostat the speed of the motors 122 and 126 may be influenced in accordance with the running speed of the instrument 25.

A further detailed explanation of the connection is deemed unnecessary, since such controls are well known in the art and may be easily carried out. One of the different possibilities, for instance, consists in employing for the power sources 123 and 127, schematically represented in Fig. 9, a small generator driven at a constant speed, and in regulating its field circuit through the above-mentioned rheostat 37, 37.

In the above-mentioned case the speed of the motors 122, 126 is adapted automatically in accordance with the running speed of instrument 25. Instead, a scale may be allotted to the control knob 33, and the field circuit of the above-mentioned generator or rheostats allotted to the motors 122, 126 may be adjusted by hand according to this scale.

The novel instruments permit dealing with any navigation problems. Both normal cross-country flights and long-distance flights as well as approaches may be simulated. The difficulties of the problems may be increased step by step. The novel apparatus for instruction purposes permits, above all, testing from an objective point of view the navigatory faculties of the pupil. Several pupils may be given the same problems to solve either in succession or simultaneously. In this case the teacher may operate several traverse tables. In judging the solutions, it may, for instance, be assumed that a navigation problem is properly solved only if the course recorded by the recording device reaches with its end point the destination within a certain maximum distance.

The use of the apparatus will now be briefly explained with reference to an example. Let the problem to be solved be the following: A flight is to take place from point A to point B (Fig. 17). First, the atmospheric conditions, particularly the upper winds as to their direction and speed, are determined from charts. Then the corresponding cam shafts are inserted in the instruments 95 and 96 (Fig. 5). Now the pupil lays out his course and adjusts with the aid of impulse transmitters 29, 30 and 28 the navigation values, i. e. course, speed and height, by considering the relative climbing and turning speed of the airplane as well as the atmospheric conditions. At the same time the teacher adjusts runway 12 and carriage 15 in such a manner that the recording pen 132 is on the point A of the map 16 of the traverse table 2. Then the instrument is switched in.

The problem proposed is, for instance, a night flight without vision. The pupil demands after a certain time the radio bearing from a point X and then the position finding from the points X and Y (Fig. 17). The teacher determines these bearings with the aid of the above-described device 151 (see Figs. 15 and 16) and communicates the values to the pupil. The device 151 is indicated at the point X in Fig. 17. The pupil ascertains, on the basis of the bearing values communicated to him, a drift and corrects his course. Then, for instance, an indication of the ground visibility is indicated by the teacher, for instance, a drift value is given to the pupil, and is considered by him in setting the course. Some time later the teacher gives the pupil a sketch of a well-defined road-crossing which the recording pen 132 has just passed. The pupil determines thereby its position by sight and effects again a corresponding change in course. In a similar manner the pupil may carry out direction findings aboard the aircraft. To this end, as above described the teacher connects the course rose 142 (Fig. 10) with the place of the radio transmitter, of which a bearing is to be taken, for instance, with the place X with the aid of a rubber band. Approaches to beacons may also be effected in the same manner as above explained. In Fig. 17 the device 150 serving this purpose is secured to the point Y. The lines L denote the beacon.

Furthermore, in the case of long flights, astronomical navigation values may also be indicated. The teacher calculates the values in respect of the actual position indicated by the recording pen 132.

All terrestrial, wireless and astronomical values correspond to the actual position of the airplane (here embodied by the recording pen 132) on the traverse table 2. The proper utilization of the indications determined by the pupil himself or in cooperation with the teacher enables the pupil to actually reach the destination B. Disturbances as caused in practice by unexpected changes in the direction of wind, wind velocity, relative speed of the airplane, course disturbances caused by ice formation, a defective operation of the mechanism etc., may without the pupil's knowledge be introduced by the teacher in the problem by operating the knobs 63, 64 and 65 so that the pupil is faced with the simulations of conditions of an actual flight as to all details. The magnitude and the moment of the occurrence of the last-mentioned influences may be determined with the aid of the multiple recorder. The circle K in Fig. 17 represents the smallest distance within which the indicated destination B must be reached in order that the problem may be considered as solved. The fact as to whether or not the destination of the airplane is theoretically reached corresponds exactly to actual conditions. However, a substantial difference, as compared to the actual navigation, lies in the fact that it is possible to determine at all times objectively by comparing the records of the pupil and those on the traverse table 2, whether and to what extent mistakes in the solution are due to faulty navigation, to outer influences which cannot be determined with sufficient accuracy, or to insufficient auxiliary navigation data.

I claim as my invention:

1. A navigating apparatus for instruction purposes comprising at least two operating tables, one of said tables intended for the pupil being provided with instruments for indicating the course, the air speed and preferably also the altitude of an imaginary flight, and signal transmitters for adjusting said instruments to show desired indications, and a second table intended for the teacher being provided with a device for automatically recording the course of flight, said recording device being controlled by the signals transmitted by the above-mentioned signal transmitters.

2. A navigating apparatus for instruction purposes comprising at least two operating tables, one of said tables intended for the pupil being provided with instruments for indicating the course, the air speed and preferably also the altitude of an imaginary flight, and signal transmitters for adjusting said instruments to show desired indications, a second table intended for the teacher being provided with a device for automatically recording the course of flight, said recording device being controlled by the signals transmitted by the above-mentioned signal transmitters, and means for varying said signals independently of the adjustment of said transmitters of said first table.

3. A navigating apparatus for instruction purposes comprising at least two operating tables, one of said tables intended for the pupil being provided with instruments for indicating the course, the air speed and preferably also the altitude of an imaginary flight, and signal transmitters for adjusting said instruments to show desired indications, a second table intended for the teacher being provided with a device for automatically recording the course of flight, said recording device being controlled by the signals transmitted by the above-mentioned signal transmitters, in combination with instruments for representing the values of the direction and wind velocity, said instruments being coupled with said altitude transmitter so that said values are dependent upon the altitude indicated by the respective instrument, and means for additionally controlling said recording device in accordance with said values.

4. A navigating apparatus for instruction purposes comprising at least two operating tables, one of said tables intended for the pupil being provided with instruments for indicating the course, the air speed and preferably also the altitude of an imaginary flight, and signal transmitters for adjusting said instruments to show desired indications, and a second table intended for the teacher being provided with a device for automatically recording the course of flight, said recording device having a recording member movable in two coordinative directions, two drives for operating said recording member, each of said drives being allotted to one of said two directions respectively, and an operative connection between said transmitters and said drives for controlling said recording device in dependence upon the adjustment of said transmitters.

5. A navigating apparatus for instruction purposes comprising at least two operating tables, one of said tables intended for the pupil being provided with instruments for indicating the course, the air speed and preferably also the altitude of an imaginary flight, and signal transmitters for adjusting said instruments to show desired indications, and a second table intended for the teacher being provided with a device for automatically recording the course of flight, said recording device having a recording member movable in two coordinative directions, two drives for operating said recording member, each of said drives being allotted to one of said two directions respectively, and an operative connection between said transmitters and said drives for controlling said recording device in dependence upon the adjustment of said transmitters, said connection containing devices for dissolving the vector of the relative speed of the airplane and the vector of the wind velocity into two components according to said two coordinative directions, in combination with addition gears arranged between said devices and said drives for forming the ground speed of the airplane in said two directions.

6. In combination with an apparatus as set forth in claim 4, a corrective gear disposed between said transmitter for adjusting the air speed and said connection, and designed for correcting the speed control value in dependence upon the altitude.

7. In combination with an apparatus as set forth in claim 1, a course indicator disposed on said recording device and operatively connected with said course adjusting signal transmitter so as to enable the teacher to read off the drift with respect to the recorded path of the airplane.

8. A navigating apparatus for instruction purposes comprising at the pupil side a set of instruments for indicating the course direction, the speed and the altitude of an imaginary flight, and controls for adjusting said instruments to indicate a desired course direction, speed and altitude, in combination with a device for recording the course of the flight, said device being arranged at the teacher side, and an operative connection between said controls and said recording device for adjusting said device in dependence upon the adjustments of said controls.

9. A navigating apparatus for instruction purposes comprising at the pupil side a set of instruments for indicating the course direction, the speed and the altitude of an imaginary flight, and controls for adjusting said instruments to indicate a desired course direction, speed and altitude, and at the teacher side a second set of instruments corresponding to those of said first set, each of said instruments being coupled with the corresponding instrument of the other set so as to effect the same indications, a recording device also arranged at the teacher side for recording the course of the flight, and an operative connection between said controls and said recording device for adjusting said device in dependence upon the adjustments of said controls.

10. A navigating apparatus for instruction purposes comprising at the pupil side a set of instruments for indicating the course direction, the speed and the altitude of an imaginary flight, and controls for adjusting said instruments to indicate a desired course direction, speed and altitude, and at the teacher side a device for recording the course of the flight, said device being operatively connected with said controls so as to be adjusted in dependence upon the adjustments of said controls, in combination with an arrangement for practicing direction findings on board, said arrangement consisting of a transmitter associated with said recording device, means for adjusting said transmitter, said means being disposed to be operated by the teacher in accordance with the direction to be determined, an adjusting device at the pupil side for eliminating the adjustment of said transmitter effected by said means, and an indicating instrument disposed at the pupil side and designed to indicate the bearing after elimination of the relative deflection of said transmitter.

11. A navigating apparatus for instruction purposes comprising two operating tables, one of said tables being intended for the pupil and being provided with instruments for indicating the direction, speed and altitude of an imaginary flight and with controls for adjusting said instruments to show a desired direction, speed and altitude, said second table intended for the teacher designed to carry a map and provided with a device for recording the course of flight on said map, said recording device being operatively connected with said controls so as to be controlled in dependence upon the adjustments of said controls, in combination with orientation means having two cooperating control members associated with said recording device and being rotatable about a geometric axis which passes through the recording point of said recording device, said members being deflective relative to each other and designed to cause corresponding to their deflection the transmission of a signal to the pupil's table, elastic means for connecting the first of said two control members with a selectable location on said map in order to be adjusted in accordance with the direction of said location relative to said recording point, an indicator arranged at the pupil's table and connected with said control arrangement so as to effect indications in response to said signal, and adjusting means arranged at the pupil's table and operatively connected with said second control member of said control arrangement for eliminating said relative deflection.

12. In combination with an apparatus as set forth in claim 11, a device for performing radio bearings from ground station, comprising a course rose designed to be placed on the aforesaid map at the location of said station, said course rose having the carrier of its lubber line and the carrier of its rose division adjusted in the NS-direction of the map and in direction towards the recording position of said recording device respectively, and elastic means for connecting one of said carriers with said recording device.

13. In combination with an apparatus as set forth in claim 11, means for practicing approaches to beacons, comprising a course rose designed to be placed on the aforesaid map at the location of said beacon, a transmitter associated with said course rose, said transmitter having an adjusting member and means for elastically connecting said adjusting member with said recording device so as to hold said adjusting member in the direction of the recording point of said recording device, and an additional instrument at the pupil's table electrically connected with said transmitter for indicating the departures of the airplane from the beacon direction.

14. A navigating apparatus for instruction purposes comprising two operating tables, one of said tables being intended for the pupil and being provided with instruments for indicating the direction, speed and altitude of an imaginary flight and with controls for adjusting said instruments to show a desired direction, speed and altitude, said second table intended for the teacher being designed to carry a map and provided with a device for recording the course of flight on said map, said recording device being operatively connected with said controls so as to be controlled in dependence upon the adjustments of said controls, in combination with an arrangement for practicing direction findings on board, said arrangement consisting of a transmitter associated with said recording device, means for adjusting said transmitter, said means being disposed to be operated by the teacher in accordance with the direction to be determined, an adjusting device at the pupil side for eliminating the adjustment of said transmitter effected by said means, and an indicating instrument disposed at the pupil side and designed to indicate the bearing after elimination of the relative deflection of said transmitter, in combination with means for performing approaches to beacons, said means comprising a course rose to be placed on the teacher's table at the location of said beacon, a second transmitter associated with said course rose and having an adjusting member and elastic means for connecting said adjusting member with said recording device so as to hold said adjusting means in the direction of the recording point of said recording device, and an operative connection between said second transmitter and the aforesaid indicating instrument so that said indicating instrument at the pupil side is common to the device for practicing direction findngs on board and to the means for practicing approaches to beacons.

15. In combination with an apparatus as set forth in claim 2, a multiple recorder operatively connected with the aforesaid means for recording the variations of said signals.

16. A navigating apparatus for instruction purposes comprising at least two operating tables, one of said tables intended for the pupil being provided with signal transmitters for adjusting the course, the air speed and preferably also the altitude of an imaginary flight, and a second table intended for the teacher being provided with a device for automatically recording the course of flight, said recording device being controlled by the signals transmitted by the above-mentioned signal transmitters, said recording device having a runway movable in one coordinate direction of said second table, and a recorder carriage movable on said runway in the second coordinate direction.

17. In combination with an apparatus as set forth in claim 8, a timepiece having the appearance of an instrument-board clock and being provided with means for adjusting its running speed within a range including speeds of a multiple amount as compared with common clocks.

18. In combination with an apparatus as set forth in claim 8, a timepiece of adjustable speed, and means disposed between said timepiece and said recording device for changing the adjusting speed of said recording device in proportion to the speed of said timepiece.

19. A navigating apparatus for instruction purposes comprising instruments for indicating the course and the air speed of an imaginary airplane flight, controls for adjusting said instruments to show a desired course and speed, a device for recording the course flown over ground, an operative connection between said recording device, said controls and said instruments, and means associated with said connection for changing the recording movements of said device in accordance with extraneous course-biasing phenomena.

20. A navigating apparatus for instruction purposes comprising instruments for indicating the course, the air speed and the altitude of an imaginary airplane flight, controls for adjusting said instruments to show a desired course, speed and altitude, a device for recording the course flown over ground, an operative connection between said recording device, said controls and said instruments, and means associated with said connection for changing the recording movements of said device in dependence upon the adjusted altitude in order to represent course-biasing wind effects.

21. A navigating apparatus for instruction purposes comprising instruments for indicating the course and the air speed of an imaginary airplane flight, controls for adjusting said instruments to show a desired course and speed, a device for recording the course flown over ground, an operative connection between said recording device, said controls and said instruments, in combination with means for changing the recording movements of said device so as to represent the course-biasing effect of wind, at least one additional control for causing an additional bias of said recording movements in order to represent other course-modifying influences, a second recorder for indicating the time and magnitude of said additional bias.

22. A navigating apparatus for instruction purposes having an operating place for the pupil and a control place for the teacher, said operating place comprising means for controlling an imaginary flight and instruments for indicating the determinants of said flight, said control place being designed to carry a chart and having a movable recording device for plotting the course of said flight on said chart, an electric network connecting said recording device, said adjusting means and said instruments, and designed to effect corresponding responses of said instruments and of said device to adjustments of said adjusting means, and biasing means arranged on said control place and connected with said network for extraneously varying the indications of said instruments and said recording device.

PAUL EDUARD KÖSTER.